United States Patent
Wu et al.

(10) Patent No.: US 10,239,449 B2
(45) Date of Patent: Mar. 26, 2019

(54) WARNING LIGHT USED IN LANE CHANGE OF A VEHICLE

(71) Applicant: MAGNA MIRRORS (Taicang) AUTOMOTIVE TECHNOLOGY CO., LTD., Jiangsu (CN)

(72) Inventors: Jun Wu, Jiangsu (CN); Zhongyin Shen, Jiangsu (CN)

(73) Assignee: MAGNA MIRRORS (Taicang) AUTOMOTIVE TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 14/878,771

(22) Filed: Oct. 8, 2015

(65) Prior Publication Data

US 2016/0272116 A1     Sep. 22, 2016

(30) Foreign Application Priority Data

Mar. 17, 2015   (CN) ..................... 2015 2 0152403 U

(51) Int. Cl.
*B60Q 1/26*   (2006.01)
*B60Q 9/00*   (2006.01)
(Continued)

(52) U.S. Cl.
CPC .......... *B60Q 9/008* (2013.01); *B60Q 1/2665* (2013.01); *B60Q 1/2669* (2013.01); *B60R 1/1207* (2013.01); *G02B 6/002* (2013.01)

(58) Field of Classification Search
CPC .... B60Q 9/008; B60Q 1/2665; B60Q 1/2669; B60Q 3/023; B60Q 1/0011; B60R 1/1207;
(Continued)

(56) References Cited

U.S. PATENT DOCUMENTS 4,776,624 A * 10/1988 Sakuma ................... B60R 1/06
                                                          296/1.11
6,290,378 B1 * 9/2001 Buchalla ............. B60Q 1/2665
                                                          362/140
(Continued)

FOREIGN PATENT DOCUMENTS

JP      H0781420 A      3/1995
JP      2014101057 A    6/2014
JP      2015048043 A    3/2015

OTHER PUBLICATIONS

Translation of Office Action dated Jul. 18, 2017 for Japanese Patent Application No. 2015-200518 filed Oct. 8, 2015, now Japanese Patent Grant No. 6258906 dated Dec. 15, 2017.

*Primary Examiner* — Y M. Lee
(74) *Attorney, Agent, or Firm* — Avery N. Goldstein; Blue Filament Law PLLC

(57) ABSTRACT

A warning light used in lane change of a vehicle is provided, in which the light is installed in a side of a rearview mirror housing where the rearview mirror is connected to the vehicle, or the lights are installed in the two sides of the two front doors of the vehicle, so that the lighting emitted by the light is deflected or directed at the driver's eyes in the vehicle. The warning light includes a housing, a light guide, at least one LED light, a circuit board and a mask which is sealed by mold welding disposed on a side of the housing. There are cavities arranged in the rearview mirror or the two sides of the vehicle's two front doors where the light is inserted and is detachably installed in the cavity. A prism in the light guide deflects and directs the emitted light toward the driver's eyes.

10 Claims, 3 Drawing Sheets

(51) Int. Cl.
*F21V 8/00* (2006.01)
*B60R 1/12* (2006.01)

(58) Field of Classification Search
CPC ........ B60R 1/06; G02B 6/002; F21S 48/1241;
F21S 48/215; F21S 48/2225; F21S
48/2231; F21S 48/2237; F21S 48/2243;
F21S 48/225; F21S 48/2268
See application file for complete search history.

(56) References Cited

U.S. PATENT DOCUMENTS

| | | | |
|---|---|---|---|
| 9,308,867 B2 * | 4/2016 | Henion et al. ........ | B60R 1/1207 |
| 2006/0291225 A1 | 12/2006 | Todd et al. | |
| 2007/0242469 A1 * | 10/2007 | Oehmann ............ | B60Q 1/2665 362/459 |
| 2009/0115631 A1 * | 5/2009 | Foote et al. ........ | B60Q 1/2665 340/901 |
| 2010/0026475 A1 * | 2/2010 | Hwang ................ | B60Q 1/2665 340/438 |
| 2014/0140081 A1 * | 5/2014 | Takahashi et al. . | F21S 48/2206 362/509 |
| 2015/0036371 A1 * | 2/2015 | Ichikawa et al. .... | B60Q 1/2665 362/511 |
| 2015/0084756 A1 * | 3/2015 | Mori ...................... | B60R 13/02 362/23.12 |

* cited by examiner

WARNING LIGHT USED IN LANE CHANGE OF A VEHICLE

FIELD OF TECHNOLOGY

The present utility model relates to the technical field of automotive components, especially to the technical field of automotive lights, in particular to a warning light used in lane change of a vehicle.

DESCRIPTION OF RELATED ARTS

Today, society is rapidly changing; science and technology are developed at a full speed; the quality of life of people has continuously improved, and the rhythm of work and life becomes faster and faster. In order to fully enjoy the high quality of life, adapt fast pace, and save time, more and more people choose to buy cars, and taking a car instead of walking has become a trend.

It is well known to us that there is a visual blind spot which is unable to eradicate at the backside of the body of the vehicle when a driver is driving because of the inherent angle between the body of the vehicle and rearview mirrors inside and outside in design. However, the existence of these visual blind spots has brought security implications to lanes change of drivers, which allegedly is the essential reason for 70% of traffic accidents (data from a highway safety investigation agency). Indeed, skilled drivers can reduce the number of the problems caused by the visual blind spots through turning, or a variety of other methods. But experience, attention, visibility (vehicles and non-motorized pedestrian, etc. in the rear side without lights turning on when it gets dark) and emergencies (when turned up to eliminate the visual blind spots, the front car is braking suddenly, etc.) are all likely to bring danger. Moreover, when the drivers make a turn in the road where lighting is dim or dark, even with the lights front and back turning on, those lights are horizontal line illumination lights, the drivers still cannot see the ground state of the turning direction and the surrounding environment of the vehicles, and the vision is not good. It is more likely to collide and scratch especially when pedestrian or vehicles are more or goods parking on roadside are more.

Therefore, there is a need to provide a signal light of a vehicle, which can remind the drivers of whether the drivers on the route may impinge with other vehicles or pedestrians during turning or changing lanes to reduce risks.

The warning light used in lane change of a vehicle of the prior art is arranged on the mirror side of the rearview mirror, so that when the warning light used in lane change of a vehicle works, the drivers in other vehicles may find the light flickering, which will disturb the people and the vehicles around; in addition, the lighting through the mirror side is easy to make the driver dizzy, which is not conductive to raising the level of human-computer interaction.

SUMMARY OF THE INVENTION

The utility model aims to overcome the drawbacks of the prior art, and provides a warning light used in lane change of a vehicle which is reasonable in design and compact in structure. This warning light used in lane change of a vehicle can emit lighting which is directed towards the driver's eyes in the vehicle to remind the driver of danger if there are other vehicles or pedestrians just on its possible roads when the driver needs to turn or change lanes.

In order to achieve the above purpose, the present utility model, a warning light used in lane change of a vehicle, has the following form:

Such a warning light used in lane change of a vehicle, of which main characteristics are that, the light is installed in a side of a rearview mirror housing where the rearview mirror is connected to the vehicle, or the lights are installed in the two sides of the vehicle's front doors, so that the lighting emitted by the light can fire at the driver's eyes in the vehicle.

Further, the light includes a housing, a light guide, and at least one LED light, the LED light and the light guide are arranged in the housing, the housing is installed in the rearview mirrors, or the housing is installed in the two sides of a vehicle's front doors.

Even further, the light also includes a circuit board, the LED light is arranged on the circuit board, and the circuit board is disposed in the housing.

Still even further, there is a mask which is sealed by mold welding disposed on a side of the housing, the light guide is disposed between the mask and the LED light, so that the lighting emitted by the LED light can be directed towards the driver's eyes in the vehicle through the mask.

Still even further, the mask is a transparent mask or a semi-transparent mask.

Further, the light is detachably installed in a side of a rearview mirror housing where the rearview mirror is connected to the vehicle, or the lights are detachably installed in the two sides of the vehicle's front doors.

Even further, there are cavities arranged in the rearview mirror or the two sides of the vehicle's front doors, the light is inserted in the cavity, therefore a sealed chamber is formed between the cavity and the housing of the light.

Still even further, the light is detachably installed in a side of a rearview mirror housing where rearview mirror is connected to the vehicle by bolts, or the lights are detachably installed in the two sides of the vehicle's front doors by bolts.

Taking such a warning light used in lane change of a vehicle in the utility model, compared to the prior art, has beneficial effects as following:

The warning light used in lane change of a vehicle in the present utility mode can emit lighting which is deflected or directed towards the driver's eyes in the vehicle to remind the driver of danger if there are other vehicles or pedestrians just on its possible roads when the driver needs to turn or change lanes; it brings safety and convenience to the drivers and passengers, it is suitable for large-scale application. In addition, the warning light used in lane change of a vehicle creatively uses light guide technology to let the point light produced by LEDs distribute uniformly on the light-emitting surfaces. By the innovative optical design, it makes the lighting only be directed at the driver's eyes in the vehicle. With a higher brightness, visibility and alert at the same time, it avoids dizziness to the driver and the disturbance to the surrounding people and vehicles.

Figure 1:
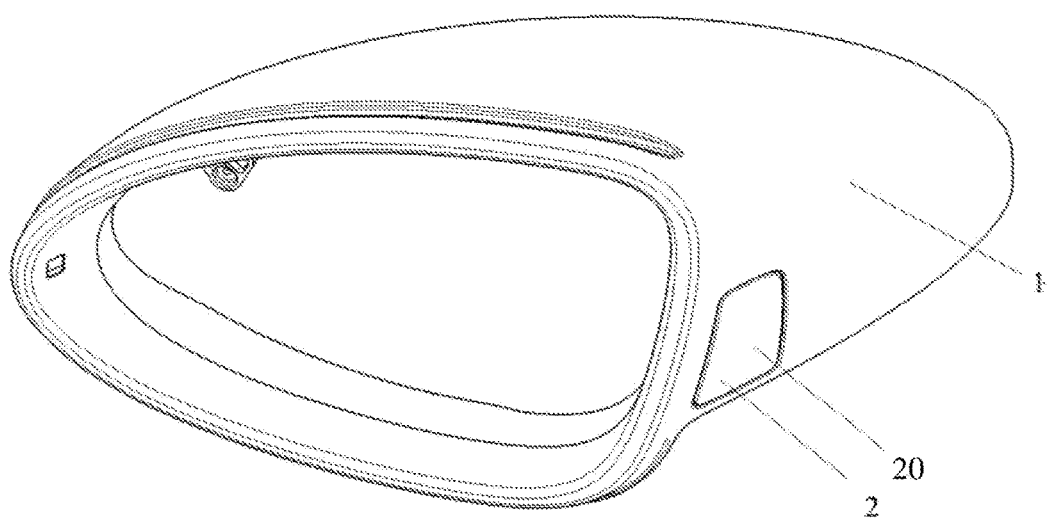
FIG. 1 is the overall schematic view of the warning light used in lane change of a vehicle which is installed in a rearview mirror in the present utility model.

Wherein,
1 Rearview mirror
11 Cavity
2 Light
20 Mask
21 Housing
22 LED light
23 Circuit board
24 Light guide
25 Optical axis
26 Vehicle front door
3 The driver's eyes

DETAILED DESCRIPTION OF THE PREFERRED EMBODIMENT

In order to be able to more clearly describe the technical content of the utility model, specific embodiments is combined below for further description.

Please refer to the FIG. 1, which is the overall schematic view of the warning light 2 used in lane change of a vehicle which is installed in a rearview mirror 1 in the present utility model. The light 2 is installed in a side of a rearview mirror housing where the rearview mirror 1 is connected to the vehicle, or the lights 2 are installed in the two sides of the vehicle's two front doors, so that the lighting emitted by the light 2 can be deflected or directed toward the driver's eyes 3 in the vehicle. The warning light 2 used in lane change of a vehicle of the prior art is arranged on the mirror side of the rearview mirror 1, so that when the warning light 2 used in lane change of a vehicle works, the drivers in other vehicles may find the light 2 flickering, which will disturb the people and the vehicles around; in addition, the lighting generated through the mirror side is easy to make the driver dizzy, which is not conductive to raising the level of human-computer interaction. However, in this utility model, the light 2 is creatively installed in a side of a rearview mirror housing where the rearview mirror 1 is connected to the vehicle, or the lights 2 are directly installed in the two sides of the vehicle's two front doors for the check of the driver in the vehicle; the structure is compact and convenient. Furthermore, what is need to be explained is that the light 2 can be installed in other places of the rearview mirrors 2 as long as the lighting emitted by the light 2 can be directed at the driver's eyes 3 in the vehicle.

Figure 2:
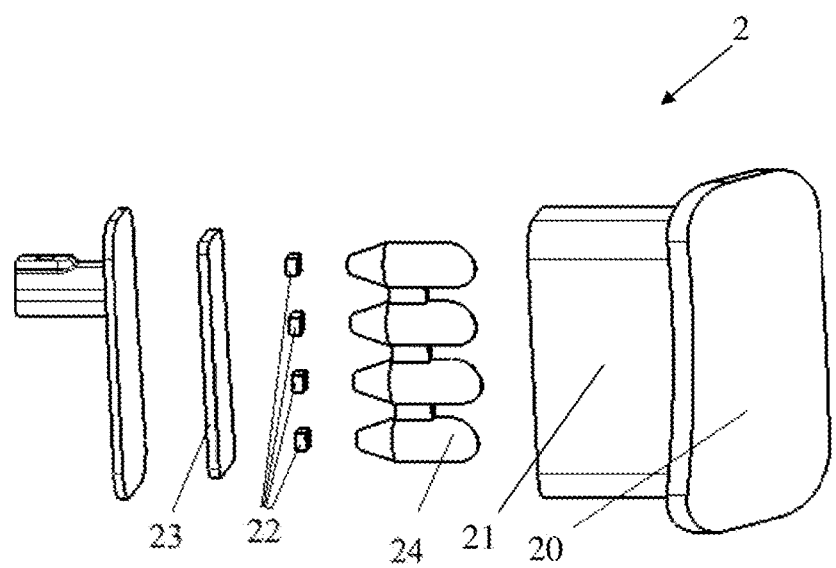
FIG. 2 is the structural schematic view of the warning light used in lane change of a vehicle in the present utility model.

Please refer to the FIG. 2, which is the schematic view of the warning light used in lane change of a vehicle in the present utility model. In a preferred embodiment, the light 2 includes a housing 21, a mask 20, a light guide 24, and at least one LED light 22, the LED light 22 and light guide 24 are arranged in the housing 21, the housing 21 is installed in the rearview mirrors 1, or the housings 21 are installed in the two sides of the vehicle's front doors.

In the utility model, in order to control the lighting of the LED light 22 to distribute uniformly and directed at the area that the driver's eyes are in, the point light of the LED light 22 is integrated and distributed into a surface light through the light guide 24 by means of designing the angle of the prism of the luminance surface of the new light guide 24 to deflect the light, solving the problem that as a point light, the LED, whose "centre is too brighter and the edge is darker", does not emit uniformly.

Moreover, in a preferred embodiment, innovative optical designs and the features of the light guide 24 are adopted in the warning light 2 used in lane change of a vehicle, greatly improving the utilization of the LED light 22, increasing by at least 30% of the light efficiency compared to similar products, and greatly improving the luminous brightness without increasing the power.

In addition, in a preferred embodiment, the innovative optical designs which largely improve luminous uniformity of the light-emitting surface are used in the warning light 2 used in lane change of a vehicle, and StdDev (StdDev of Luminance on the light-emitting surface) of Luminance on the light-emitting surface has decreased by 50% compared to similar products. At the same time, it avoids the shortcoming that the centre is too brighter and the edge is darker, and the problems that it is easy to make the drivers dizzy when using point source in similar products.

In another preferred embodiment, by the innovative optical designs, the warning light 2 used in lane change of a vehicle makes the lighting only be directed at the driver's eyes in the vehicle, which is very visible to the drivers and cannot disturb the surrounding people and vehicles. It is safer and more effective than the similar products.

Moreover, in a preferred embodiment, the light 2 also includes a circuit board 23, the LED light 22 is arranged on the circuit board 23; the circuit board 23 is disposed in the housing 21.

In a preferred embodiment, there is a mask 20 which is sealed by mold welding disposed on a side of the housing 21, the light guide 24 is disposed between the mask 20 and the LED light 22, so that the lighting emitted by the light 22 can be directed toward the driver's eyes 3 in the vehicle through the mask 20.

The mask 20 is a transparent mask or a semi-transparent mask. In a preferred embodiment, it effectively avoids the driver's dizziness problem caused by the sunlight reflection by means of using a neutral gray semi-transparent mask. In another preferred embodiment, the mask 20 is at least a partially transparent mask or a partially semi-transparent mask.

Figure 5:
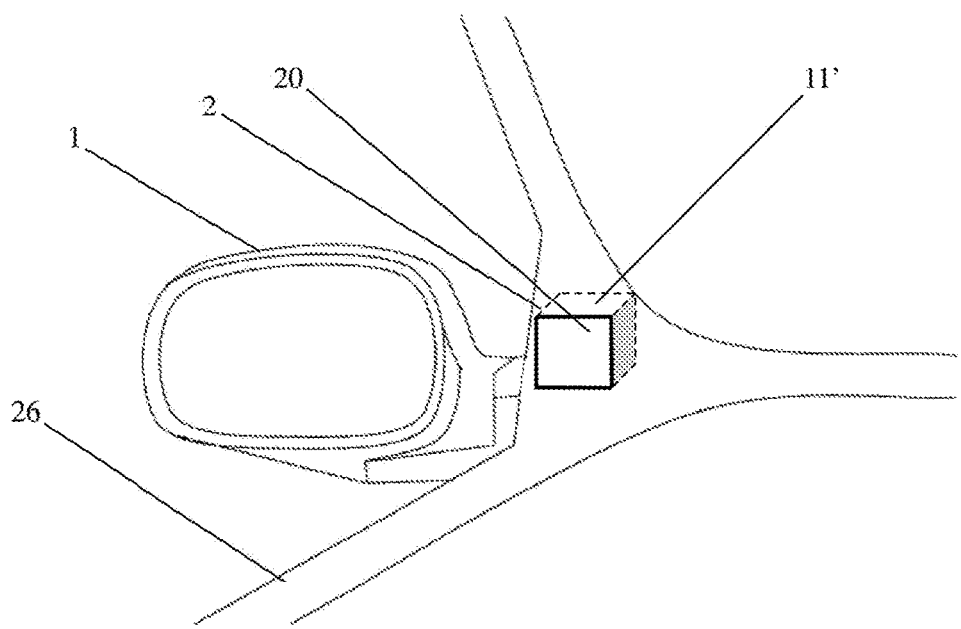
FIG. 5 is the overall schematic view of a rearview mirror with a warning light used in lane change of a vehicle which is installed in the side of the vehicle door.

In one preferred embodiment, the light 2 can be fixed on a rearview mirror or be fixed in the two sides of the vehicle's two front doors as shown in FIG. 5 for the driver side front door 26; in other preferred embodiments, the light 2 is detachably installed in a side of a rearview mirror housing where the rearview mirror 1 is connected to the vehicle, or the lights 2 are detachably installed in the two sides of the vehicle's front doors in a cavity 11'.

Figure 3:
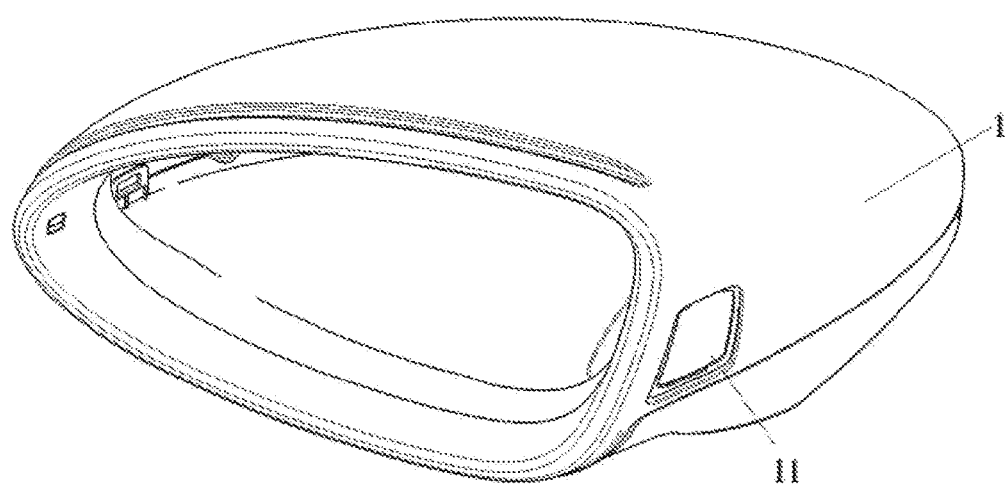
FIG. 3 is the structural schematic view of a cavity in a rearview mirror in the present utility model.
Figure 4:
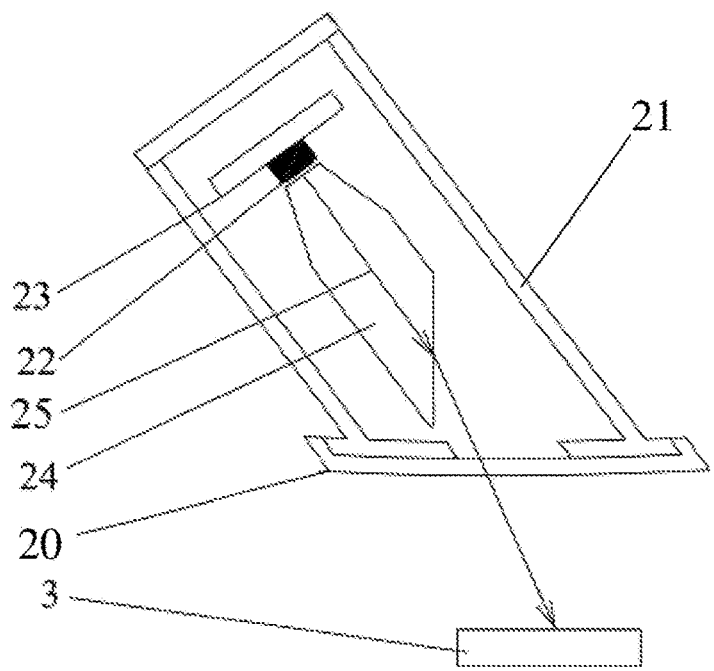
FIG. 4 is the optical view of the warning light used in lane change of a vehicle in the present utility model.

Please refer to the FIG. 3, which is the structural schematic view of a cavity 11 in a rearview mirror 1 in the present utility model. In one preferred embodiment, there is a cavity 11 arranged in the rearview mirror 2 or there are cavities 11 in the two sides of the vehicle's two front doors, the light 2 is inserted in the cavity 11, therefore a sealed chamber is formed between the cavity 11 and the housing 21 of the light 2. In other preferred embodiments, the light 2 is detachably installed in a side of rearview mirror housing 21 where the rearview mirror 1 is connected to the vehicle by bolts, or the lights 2 are detachably installed in the two sides of the vehicle's front doors by bolts.

The light 2 can be any suitable warning light, for example a warning light with higher brightness, visibility and alert. Please refer to FIG. 1 to FIG. 2, in the embodiments of the present utility model, the light 2 is installed in the inner side of a rearview mirror 1, which can effectively avoids dizziness of the drivers in the vehicles and the disturbance to the surrounding people.

Taking the present utility model, turning on the light 2 can effectively remind the safe road environment around the vehicle when the driver wants to turn or change lanes during the vehicle travels. The design is novelty, and the structure is compact. It is easy to maintenance and the use cost is low. That lighting distributes uniformly on the lighting-emitted surface makes the area and shape of the lighting-emitted surface meets the specified requirements and the warning requirements. In addition, with the structure being compact, the design of a warning light 2 used in lane change of a vehicle in the present utility model being reasonable, it can effectively remind the safe road environment of surroundings, and give the drivers and passengers high visibility and alert. And it is suitable for large-scale application.

Taking such a warning light 2 used in lane change of a vehicle in the utility model, compared to the prior art, has beneficial effects as following:

The warning light 2 used in lane change of a vehicle in the present utility mode can emit lighting which is directed at the driver's eyes 3 in the vehicle to remind the driver of danger if there are other vehicles or pedestrians just on its possible roads when the driver needs to turn or change lanes; it brings safety and convenience to the drivers and passengers, it is suitable for large-scale application. In addition, the warning light 2 used in lane change of a vehicle creatively uses light guide 24 technology to let the point sources produced by LEDs distribute uniformly on the light-emitting surfaces. With the innovative optical design, it makes the lighting only be deflected and directed towards the driver's eyes in the vehicle. With a higher brightness, visibility and alert at the same time, it avoids dizziness to the driver in a vehicle and the disturbance to the surrounding people.

The above-described embodiments are preferred ones of the present patent and not intended to limit the scope of the present utility model. In the premise without departing from the principle of the utility model premise, the improvements, changes, composition, replacement and so on made by the technicians skilled in the art all belongs to the scope protected by the claims in the present utility model.

In this specification, the present utility model has been described with reference to the specific embodiments. However, obviously modifications and variations still can be made without departing from the spirit and scope of the utility model. Accordingly, the specification and drawings are to be regarded as illustrative rather than restrictive.

We claim:

1. A rearview mirror comprising:
   a mirror housing adapted to secure to a vehicle, the mirror housing having an inner side proximal to a front door of the vehicle;
   a mirror within the mirror housing positioned to face rearward with the mirror housing;
   a warning light comprised of at least one LED within a cavity on the inner side in the mirror housing;
   a light guide having an angle of prism to a luminance surface remote from the warning light that deflects light emission from the warning light from an incident optical angle towards the eye of a driver in the vehicle, the light guide being positioned in the cavity and between the warning light and the inner side of the mirror housing used in lane change of a vehicle, the light guide having a shape formed by a frustum and a cylinder connected to an end of the frustum having a larger diameter, wherein the cylinder has a slope through which light is transmitted; and
   a mask which is sealed by mold welding disposed on the inner side of the mirror housing, the light guide is disposed on an-area between the mask and the at least one LED light, so that the lighting emitted by the warning light is deflected toward the driver's eyes in the vehicle through the mask.

2. The rearview mirror according to claim 1, wherein the warning light further comprises a circuit board, the at least one LED light is arranged on the circuit board.

3. The rearview mirror according to claim 1, wherein the mask is a transparent mask or a semi-transparent mask.

4. The rearview mirror according to claim 1, wherein the warning light is detachably installed in the mirror housing.

5. The rearview mirror according to claim 1, wherein the rearview mirror is connected to the vehicle by bolts.

6. A warning device used in lane change of a vehicle comprising:
   a warning light formed with at least one LED;
   a set of housings each housing containing a light guide having an angle of prism to a luminance surface remote from the warning light that deflects light emission from the warning light from an incident optical angle towards the eye of a driver in the vehicle, where one of each of the housings is installed in a set of cavities, the set of cavities present on interior surfaces on both of a pair of front doors of the vehicle;
   where the light guide has a shape formed by a frustum and a cylinder connected to an end of the frustum having a larger diameter, wherein the cylinder has a slope through which light is transmitted; and
   a mask which is sealed by mold welding disposed on an outward face of each housing of the set of housings, the light guide is disposed on an area between the mask and the at least one LED light, so that the lighting emitted by the warning light is deflected toward the driver's eyes in the vehicle through the mask.

7. The warning device according to claim 6, wherein the warning light further comprises a circuit board, the at least one LED light is arranged on the circuit board.

8. The warning device according to claim 6, wherein the mask is a transparent mask or a semi-transparent mask.

9. The warning device according to claim 6, wherein the warning device is detachably installed in each of the set of cavities cavity.

10. The warning device according to claim 6, wherein the warning device is connected to the vehicle by bolts.

* * * * *